United States Patent [19]
Gilovich

[11] Patent Number: 5,343,347
[45] Date of Patent: Aug. 30, 1994

[54] MAGNETIC DISK STORAGE MODULE WITH MULTIPLE SETS OF ACTUATOR ARMS FOR SIMULTANEOUS READ/WRITE OPERATIONS AT DIFFERENT CIRCUMFERENTIAL LOCATIONS WITHIN THE DISK STACK

[76] Inventor: Paul A. Gilovich, 100 Buckingham Dr. #203, Santa Clara, Calif. 95051

[21] Appl. No.: 944,283

[22] Filed: Sep. 14, 1992

Related U.S. Application Data

[63] Continuation-in-part of Ser. No. 877,092, May 1, 1992.

[51] Int. Cl.⁵ .............................................. G11B 5/55
[52] U.S. Cl. .................................... 360/106; 360/104
[58] Field of Search ....................... 360/104, 106, 98.01

[56] References Cited

U.S. PATENT DOCUMENTS

| | | | |
|---|---|---|---|
| 4,330,806 | 5/1982 | Iwabuchi | 360/106 |
| 4,544,972 | 10/1985 | Kogure | 360/106 |
| 4,544,973 | 10/1985 | De Bult | 360/106 |
| 4,787,001 | 11/1988 | Okutsu | 360/106 |
| 5,081,552 | 1/1992 | Glaser | 360/98.01 |
| 5,223,993 | 6/1993 | Squires | 360/75 X |

FOREIGN PATENT DOCUMENTS 60-18869  1/1985  Japan ................................. 360/106

Primary Examiner—A. J. Heinz
Attorney, Agent, or Firm—Robert S. Kelly

[57] ABSTRACT

A hard disk drive module for providing memory storage for a computer includes a centrally positioned rotatable stack of disks and a plurality of rotary actuator arms mounting magnetic heads for movement radially of the disks to read/write magnetically encoded data on each surface thereof. The actuator arms which extend between adjacent spaced disks are provided by plural-arm assemblies individually pivotally mounted at each of the four corners of the module so that the radial tracking movement of the heads thereon occurs in angularly spaced locations in the disk stack. Each actuator assembly is driven by a drive arm extending at an acute angle with the longitudinal axes of the associated actuator arms so as to minimize the required space on the module for the drive elements.

21 Claims, 2 Drawing Sheets

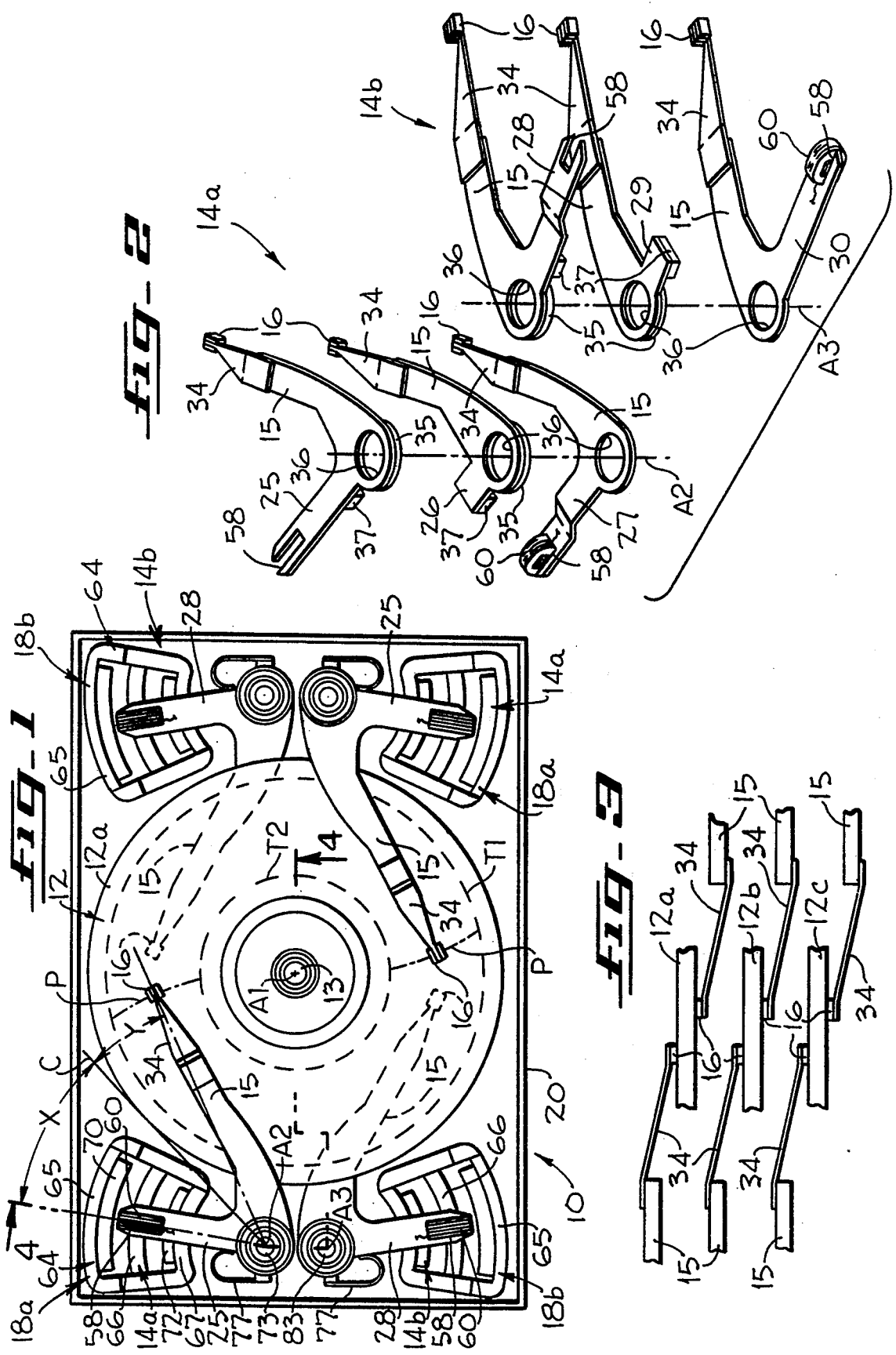

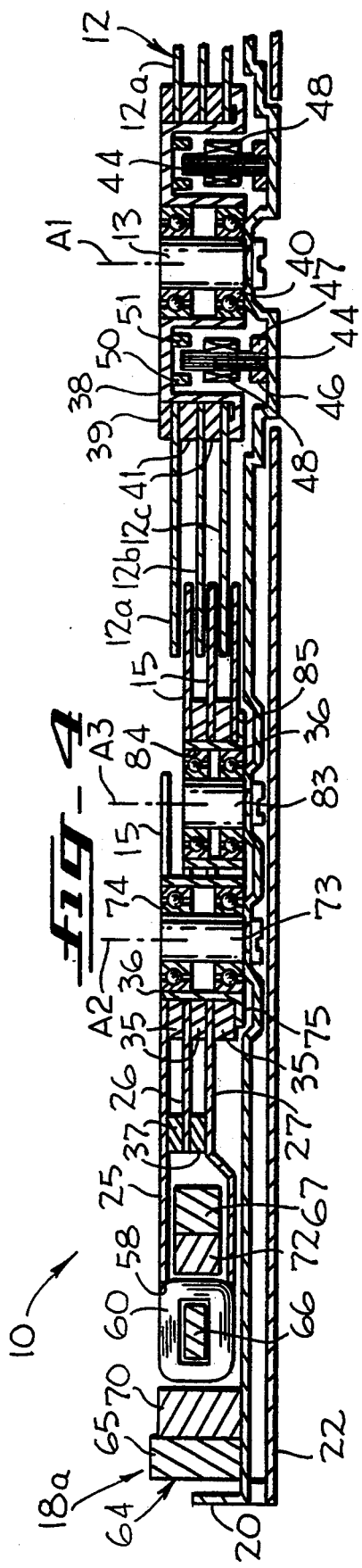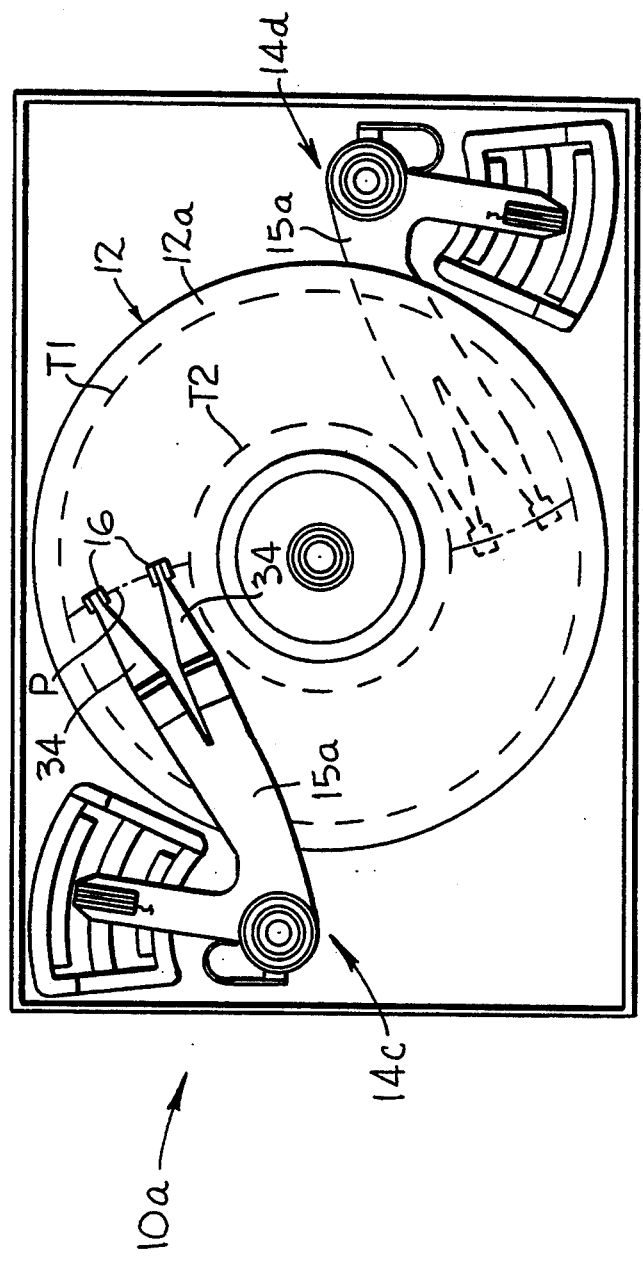

MAGNETIC DISK STORAGE MODULE WITH MULTIPLE SETS OF ACTUATOR ARMS FOR SIMULTANEOUS READ/WRITE OPERATIONS AT DIFFERENT CIRCUMFERENTIAL LOCATIONS WITHIN THE DISK STACK

CROSS-REFERENCE TO RELATED APPLICATION

This application is a continuation-in-part of U.S. patent application Ser. No. 877,092, filed May 1, 1992 by Paul A. Gilovich and entitled Magnetic Disk Storage Apparatus.

BACKGROUND OF THE INVENTION

1. Field of the Invention

The present invention pertains to magnetic disk storage apparatus, and more particularly, it pertains to the high capacity hard disk drive modules having a rotatable stack of closely spaced disks with multiple magnetic head tranducer arms movable radially of the stack for reading from and recording on opposite faces of each of the disks.

2. Description of the Prior Art

In today's markets, with the proliferation of the use of computers, both for personal and for business use, there is an ever increasing demand for higher and higher capacity memory devices. The basic memory storage device of computers is the so-called hard disk drive comprised of a rigid disk, or more typically, a stack of closely spaced rigid disks, with actuator arms carrying tiny magnetic transducer heads being adapted to move radially within such stack of disks in comb-like fashion to record and read magnetically encoded data along circumferential cracks on both faces of all of such superimposed disks. Since computers are built with certain predefined spaces for accommodating the aforedescribed hard disk drive devices, the overall dimensions of such devices, or modules, have been fixed into a plurality of package sizes or form factors. Thus, increases in the memory capacity of a disk drive module of a given industry standard package size have been made either by increasing the density of the data written on a given area of a disk or by an improved mechanical design, e.g., by providing a greater number of disks in a given package size.

In addition to maximizing the number of disks in a given package size, various attempts have been made to improve the magnetic head positioning mechanisms, i.e., the actuator arms and the drive arrangements thereof, in order to improve access time, positioning precision, and reading reliability. In prior art mechanisms, two different types of magnetic head positioner mechanisms, or actuator arms, have been developed. Linear positioners comprise a carriage carrying actuator arms which are moved radially with respect to the axis of rotation of the disks in order to position the magnetic heads along various of the circumferentially arranged tracks. Pivotally mounted actuator arms, or rotational positioners, pivot about an axis parallel to the axis of the disk stack so that the magnetic heads carried at the distal ends thereof are swung in arcuate paths across the magnetically encoded tracks of the disks.

Such pivotally mounted actuator arm assemblies generally include counterbalancing drive arms provided with a voice-coil motor or servo-motor for providing the rotational movement thereto. There has been a continuing search for new and different ways to design such rotational drive mechanisms in order to improve data access time and reading reliability, and various arrangements have been proposed in order to fit within the predescribed package size dimensions and yet provide as efficient and reliable a mechanism as possible.

In a conventional actuator arm assembly of the typical prior art hard disk drive devices the actuator arms and the magnetic heads supported thereby are positioned one above the other in a superimposed arrangement so that all of the arms move jointly within the disk stack with the magnetic heads traversing identical superimposed paths across the opposed faces of the disks. This requires that the spacing between adjacent disks be such as to accommodate a pair of magnetic heads, the flexure mountings therefor, and the required supporting arm dimensions. In recent years, attempts have been made to decrease this required dimension between disks in a stack by offsetting the magnetic heads and their flexure mountings between the opposed faces of adjacent disks so that the spacing between disks can be reduced to accommodate just slightly greater than that required for the support arm and a single flexure mounting and its supported magnetic head. For example, in U.S. Pat. No. 4,800,455 to Takizawa, a linear positioning mechanism is shown wherein the magnetic head support arms for moving radially between a pair of opposed disk faces are offset and arranged at an angle to each other: thus, the required spacing between disks is just slightly more than that required for a single support arm, and offset, but identical, radial paths of movement are provided across the opposed faces of the disks by the actuator arms.

A rotational magnetic head positioning mechanism having a similar disk spacing minimization concept is shown in U.S. Pat. No. 4,937,693 to Connolly et al. In the disk drive structure shown and described in this patent, a pair of magnetic heads and their supporting flexure arms are mounted in parallel upon a pivotally mounted actuator arm and are adapted to be swung through slightly offset arcuate paths between adjacent disks of the disk stack. Such paths, however, will not be identical and will vary in length whereby the magnetic heads when starting at the same track position (the outermost concentric track on the disks) will finish at different track positions as they are moved simultaneously across the respective faces of the opposed disks. Thus, one of the heads will not fully utilize the tracking space on its disk. Furthermore, the differences in the skew angles of the head gaps of the heads with the tracks on the disks creates tracking problems which can effect the reliability of the system.

A similar rotary actuator structure for a stacked magnetic disk arrangement is shown in U.S. Pat. No. 5,027,242 to Nishida et al. Again, a pair of magnetic transducer heads are located on a pair of flexure arms mounted in generally parallel relationship on a common actuator arm. The magnetic heads and their supporting flexure arms are moved in arcuate paths across the opposed faces of a pair of opposed disks in a disk stack. In the arrangement shown and described in the patent, the problem of the apparatus of the aforedescribed U.S. Pat. No. 4,937,693 are magnified in that the tracking paths of the adjacent magnetic heads vary significantly as the magnetic heads are moved radially inwardly across the opposed disk faces so that the inner head passes across a significantly fewer number of the circumferentially arranged tracks. Furthermore, the difference in the paths of movement of the heads of necessity creates significant problems in maintaining acceptable skew angles of the head gaps with the recording tracks on the disk throughout the radial movement of the heads.

Multiple magnetic heads can also be used on a single actuator arm communicating with a single surface of a magnetic recording disk to reduce data access time. As shown, for example, in U.S. Pat. No. 4,787,001 to Okutsu, a rotary actuator arm mounts a pair of magnetic heads one of which is adapted to move over the radially outer portion of the recording tracks on the disk while the other head moves across the radially inner tracks on the disk.

SUMMARY OF THE INVENTION

With the present invention a magnetic disk storage apparatus is provided which generally eliminates the aforedescribed problems encountered with prior art magnetic disk storage devices having rotary actuators carrying the magnetic transducer heads and which seek to decrease the required disk spacing by offsetting the magnetic heads and their support assemblies between opposed disk surfaces. In the present invention, as with the structure shown in the patents cited, those magnetic head support arms which are provided between a pair of opposed disks are offset in a plane parallel to the faces of the disks so that a minimum spacing may be utilized between the disks. However, the arms are angularly positioned relative to each other in such plane so that the heads may follow generally identical paths across the opposed disk surfaces out on opposite sides of the disk stack. Thus, the relationship of both of the offset magnetic transducer heads with the disk surfaces will be the same and the skew angle relationship of the magnetic heads with the data tracks will be approximately the same as found in prior rotary actuators of the conventional type wherein all of the magnetic heads are aligned along an axis parallel to the axis of rotation of the disk stack.

Furthermore, with the present invention, each actuator arm assembly carrying a plurality of magnetic transducer heads is arranged to be driven by a drive arm projecting from one of the actuator arms with the angle between such drive arm and the actuator arm being less than 90 degrees so that the drive arm and actuator arm are generally arranged at acute angles with a plane that passes through the actuator arm pivot axis tangentially to the edges of the disks. With such an arrangement and with the actuator arm pivot axis being located adjacent to the disk stack, the actuator assembly may be fitted into a minimal space in the overall package in order to reduce the size of the package or to permit the inclusion of a second, third and fourth independent actuator assembly to be installed in the same package without decreasing the size of the disks accommodated thereby.

The drive arrangement for the magnetic head carrying assembly for read/write communication with all of the disk surfaces is generally provided by a pain of actuator arm assemblies independently driven and with the drive arms therefor extending in opposed directions outwardly of the stack of disks so that the magnetic heads carried by one actuator assembly reads from or records on disk faces at one side of the disk stack and the magnetic heads carried by the other actuator assembly reads from or records on disk faces at the opposed side of the disk stack.

Such a drive arrangement permits a conventionally sized magnetic disk storage module that includes four independently driven actuator arm assemblies, one being positioned at each of the four corners of the rectangularly shaped module to provide multiple data access points. Thus, data access time as well as data capacity for a given module size are significantly improved with the apparatus of the present invention.

BRIEF DESCRIPTION OF THE DRAWINGS

FIG. 1 is a plan view of a magnetic disk storage module embodying the present invention, such module being shown with the cover thereof removed.

FIG. 2 is an exploded isometric view of one of the pairs of rotary actuator assemblies of the magnetic disk storage module of FIG. 1.

FIG. 3 is a schematic side elevation view of the projecting ends of the actuator arms of a pair of the rotary actuator assemblies of the magnetic disk storage module of FIG. 1.

FIG. 4 is an enlarged section taken along line 4—4 of FIG. 1.

FIG. 5 is a plan view of a magnetic disk storage module including a second embodiment of the present invention, such module being shown with the cover thereof removed.

DESCRIPTION OF THE PREFERRED EMBODIMENTS

Referring first to FIG. 1, there will be seen a hard disk storage module 10 with its enclosing cover removed so as to expose the various components thereof. The module is comprised of a stack 12 of closely spaced, superimposed disks which, in the particular embodiment shown, comprise three disks 12a, 12b and 12c (FIGS. 3 and 4). These disks are mounted for rotation upon a spindle 13 and about a vertical axis A1. Mounted adjacent to opposed sides of the disk stack 12 and at opposite ends of the module are a closely spaced pair of rotary actuator assemblies 14a and 14b, each assembly being comprised of a plurality of actuator arms 15 (the uppermost one only being shown in FIG. 1). Each actuator arm carries a conventional magnetic transducer head 16 at its distal end for movement across one of the faces (upper or lower) of each of the disks 12a, 12b or 12c, and it will be seen (FIGS. 2 and 3) that the heads 16 of actuator assemblies 14a track across the upper faces of the disks 12 while the heads 16 of actuator assemblies 14b track across the lower faces of the disks 12. The rotary actuator assemblies 14a, 14b are independently driven so as to move the magnetic heads 16 along arcuate paths P within the disk stack by means of a pair of voice-coil motors 18a, 18b positioned at opposed corners of the module as shown, with such head paths P permitting the recording or reading of magnetically encoded data along a plurality of concentric tracks extending from an outer track T1 to an inner track T2 across the disk faces in the well-known manner. The entire module is housed in a rectangular package of an industry standard size or form factor, and further includes a metallic base 20 and a conventional printed circuit board assembly 22 (FIG. 4) mounted therebelow for molding the conventional electronic control and power supply components. A closing cover (not shown) is adapted to be fitted to the upturned wall (FIG. 4) of the base 20 to seal off the movable mechanical components of the module.

While, as pointed out hereinbefore, two separate pairs of actuator assemblies 14a, 14b are shown, one at each side of the module, it will be appreciated that they are adapted to be independently driven but otherwise are identical in structure and function.

An important feature of the present invention is the rotary actuator assembly combination 14a, 14b, which is shown in exploded detail in FIG. 2 of the drawings. Assembly 14a, which is arranged to track across the upper faces of the disks 12 will be seen to be comprised (in the particular three-disk arrangement of the present invention illustrated) of an upper actuator arm 15 for reading from or writing on the uppermost surface of the top disk 12a and including a laterally projecting drive arm 25: a central actuator arm 15 for reading/writing communication with the upper face of the center disk 12b in the disk stack and having a short support arm 26 extending laterally therefrom: and a lower actuator arm 15 for reading/writing communication with the upper face of the lowermost disk 12c in the disk stack and including a downwardly stepped drive arm 27 laterally protecting therefrom. Similarly, assembly 14b will be seen to be comprised of an upper actuator arm 15 for reading/writing communication with the lower surface of the top disk 12a and including an upwardly stepped drive arm 28 laterally projecting therefrom: a central actuator arm 15 for reading/writing communication with the lower face of the center disk 12b in the disk stack and having a short support arm 29 extending laterally therefrom: and a lower actuator arm 15 for reading/writing communication with the lower face of the lowermost disk 12c in the disk stack and including a laterally projecting drive arm 30. As will be obvious, with the addition of further disks in the disk stack 12, additional actuator arms 15 may be added to the rotary actuator assembly so as to provide magnetic transducer heads 16 sufficient to provide read/write communication with all magnetically encoded disk surfaces.

Each actuator arm 15 in the rotary actuator assemblies 14a, 14b (FIG. 2) will be seen to carry a thin metallic spring member, or flexure, 34 which is bonded to the distal portion of the actuator arm. Each flexure 34 carries at its distal end a magnetic transducer head 16 by means of a conventional head gimbal assembly so that the head will be received in a parallel, closely spaced relationship (4–5 microinches) with the disk surface that it is arranged to communicate with. Appropriate conductive leads 77 (FIG. 1) are connected between the PC board 22 and the various magnetic heads 16 to transmit to or receive data from the data tracks T1–T2 on the disk faces.

The rotary actuator assemblies 14a, 14b are arranged to be mounted about upstanding pivot axes A2, A3, respectively, that are closely spaced from each other directly adjacent to the edge of the disk stack and that extend parallel to the disk stack axis of rotation A1. As can be seen from FIG. 1, the axes A2 and A3 are positioned just far enough apart to permit full rotation of the actuator assemblies 14a, 14b with the heads 16 thereof being carried between extreme track portions T1–T2 without interference between the actuator assemblies. Each of the actuator arms 15 of each actuator assembly are rigidly secured together for joint rotation by means annular spacer rings 35 and spacer pads 37 (FIGS. 2 and 4) which are bonded to the overlying and underlying surfaces of the drive arms 25, 27, 28, 30 and support arms 26, 29, as shown. A circular aperture 36 is provided at the rear edge of each of the actuator arms in alignment with the adjacent spacer ring or rings 35 to adapt the actuator assemblies to be rotatably mounted about the pivot axes A2 and A3. Such mountings are best seen in the cross-sectional view of FIG. 4. The mounting for assembly 14a will be seen to be comprised of an upstanding spindle 73 rigidly fixed to the base 20, a plurality of cylindrical bearings 74 fitted about the spindle, and a bearing sleeve 75 for receiving the actuator assembly through the apertures 36 and mounting it for rotation about the spindle axis A2. The mounting for assembly 14b will be seen to be comprised of an upstanding spindle 83 rigidly fixed to the base 20, a plurality of cylindrical bearings 84 fitted about the spindle, and a bearing sleeve 85 for receiving the actuator assembly through the apertures 36 and mounting it for rotation about the spindle axis A3.

When the disk storage module 10 is operated within a computer or the like, the disk stack 12 is arranged to be continuously rotated about the spindle 13 by means of a conventional DC motor structure which can best be seen in FIG. 4. A lamanated stator core structure of annular shape is fixed to the base 20 of the module by a pair of annular mounting rings 46, 47. Fitted within longitudinally extending slots and annularly spaced about the stator structure 44 are a plurality of coils 48 with such coils being mounted tightly about the stator lamanations and being provided with suitable connections (not shown) to a power supply. An annular mounting hub 38 is provided to rotatably mount the disk stack with such hub being rotatably secured through cylindrical bearings 40 with the upright spindle 13. Arranged upon the inner, downwardly extending face of the hub 38 are a pair of annular magnets 50, 51 which project downwardly about the upper annular end of the stator 44 so as to receive the electrical flux transfer therefrom in the well-known manner. The disks 12a, 12b and 12c of the disk stack are secured together by annular spacer members 41 positioned between the disks and by an annular clamping ring 39 above top disk 12a. In the well-known manner, the application of a DC current to the coils 48 provides an electromotive force between the stator and the annular magnets 50, 51 so as to cause the hub 38, and the disk stack 12 supported thereby, to rotate about the axis A1 of the stack.

As can be best seen in the exploded view of FIG. 2, the drive arms 25, 27, 28 and 30 of the actuator assemblies 14a, 14b are arranged to make drive connections to the voice-coil motors 18a, 18b, respectively. The vertically superimposed drive arm pair 25, 27 extends in a generally diametrically opposed direction to that of the other pair 28, 30 and from a plane passing through the axis of rotation of the disk stack 12 and bisecting the rotary actuator assemblies 14a, 14b. The outermost end of each of the drive arms 25, 27, 28, 30 is provided with an axially extending slot 68 which is adapted to receive and be bonded to a coil 60 so that each superimposed drive arm pair 25, 27 and 28, 30 supports a single coil. Thus, two coils 60 are provided, one for each actuator assembly 14a, 14b and each is arranged to extend between the upper and lower drive arms 25, 27 and 28, 30 whereby induced movement in a coil will result in rotation of the respective drive arm assembly about the actuator axis A2 or A3 and hence movement of the magnetic transducer heads 16 across their associated disk faces.

Each of the coils 60 is thus arranged to comprise the movable part of the voice-coil motor 18a or 18b positioned laterally of the rotary actuator axes A2 or A3. As can be seen from FIG. 1 and FIG. 4, the means for imparting movement to each coil comprises a steel cage structure 64 which is adapted to be rigidly attached to the base 20 of the module. Each cage 64 includes an arcuately curved forward section 65 upon which the module cover (not shown) is adapted to sit, a narrow central arcuate section 66 which is adapted to receive for free travel therealong a respective coil 60, and a rearward arcuate section 67 positioned adjacent to the rotary actuator assembly 14. Upon the upright faces of the outer and inner sections 65, 67 are provided a pair of permanent magnets 70, 72 respectively, with the faces of such magnets being closely spaced from and in arcuate alignment with the opposed faces of the coil 60. Thus, in the conventional manner, by applying a DC current to the coils 60, an electromotive force is induced between the coils and the surrounding magnets so as to create the required pivotal movement of the drive pairs 25, 27 and 28, 30 and the respective actuator assemblies 14a, 14b.

It will also be appreciated that the arcuate line of force applied by each motor 18a, 18b, along the central cage member 66, will pass through the center of percussion of the associated actuator arm assembly 14a, 14b so as to minimize the forces on the rotary bearings 74, 84 mounting the rotary actuator assemblies 14a, 14b on the spindles 73, 83, respectively, thereby providing greater drive efficiency and responsiveness and significantly reducing or eliminating the resident resonances set up in the support bearings during operation of the apparatus.

As can be seen in the plan view of FIG. 1, wherein drive arm 25 of the uppermost actuator arm 15 is positioned about midway through its arcuate path of travel, a pair of rather shallow acute angles X and Y, each less than about 45 degrees, are provided between the longitudinal axis of the actuator arm 15 and the longitudinal axis of the drive arm 25 with a plane C that passes through the pivot axis A2 and the tangential edge of the disk stack 12. While these angles X, Y will obviously change as the actuator arm 15 is rotated back and forth through its arcuate path of movement, they will both remain within narrow acute angle ranges of less than about 50 degrees since the drive motor 18a is conveniently positioned quite closely adjacent to the edge of the disk stack 12. Although not specifically illustrated, it will be appreciated that the positioning of the other actuator assembly 18b will be identical to that previously described with respect to actuator arm assembly 18a as it relates to the disk stack 12. This preferred actuator assembly arrangement eliminates the need for excessive module space outside of the perimeters of the disks by minimizing the required spacing for actuator arm assembly 14a, 14b. A conventional hard disk assembly having the same size disk stack 12 and a conventional rotary actuator assembly will require an additional longitudinal dimension of the package from the standard size in order to accommodate such conventional rotary actuator. Thus the design of the present invention permits the standard package size to be reduced which reduction may be productively utilized as will be pointed out hereinafter.

An important feature of the present invention is illustrated in FIG. 3 of the drawings. In a conventional hard disk drive apparatus the actuator arms which extend between a pair of spaced disks support in superimposed relationship and on opposite sides thereof a pair of flexures carrying magnetic transducer heads at the ends thereof for read/write engagement with the surfaces of the opposed disks. In the present invention (FIG. 3), a pair of offset actuator arms 15 are provided between each disk with such arms being located in the same horizontal plane and with one of such arms supporting the flexure 34 and magnetic head 16 assembly for reading or writing on the surface of one disk while the other actuator arm supports the flexure/magnetic head assembly for reading or writing on the other opposed disk surface. Two advantages are achieved by such an arrangement. First, since each actuator arm in the present invention needs support only a single magnetic head assembly, it may be made significantly thinner than those conventional actuator arms of the prior art. Furthermore, since the flexure arms are offset from each other, one may be mounted upon the underside of its supporting actuator arm 15 while the other is mounted on the upper side of its supporting actuator arm so that the overall required spacing between the disk surfaces may be significantly reduced. Thus, with a typical prior art actuator arm assembly, 0.06 inches is required for the support actuator arm and 0.033 inches is required for each flexure mounting of the magnetic head 16 on the actuator arm, thereby making a total of 0.126 inches required between adjacent disks. In the present invention the actuator arm thickness may be reduced to 0.02 inches with only spacings of 0.015 inches being provided between each surface of the actuator arm and the opposed disk face and with such spacing still providing the necessary 0.033 inches for the flexure mounting of the magnetic head as in the prior art devices. Thus, the overall required spacing between disks with the actuator of the present invention is only 0.05 inches as opposed to the 0.126 inches required in typical prior art apparatus; thus, the apparatus of the present invention decreases the required spacing between disks by over one-half. It will thus be appreciated that for a given form factor, or industry standard package size of hard disk module, a greater number of disks may be included with the apparatus of the present invention thereby increasing the data capacity of the device.

As previously pointed out, the module size for a given disk diameter may be reduced with the apparatus of the present invention due to the decreased space required for a pair of actuator assemblies 14a, 14b as compared to the conventional actuator arm drive arrangements. This space savings can be utilized to provide a second pair of actuator arm assemblies 14a, 14b operated entirely independently of the first actuator arm assemblies 14a, 14b so that a pair of independent read/write operations may be provided for a single disk stack. This is achieved in the described embodiment of the invention by providing one actuator arm assembly pair 14a, 14b at one end of the module and a second pair 14a, 14b at the other end of the module as shown in FIG. 1. Such an arrangement of plural actuators has been utilized in hard disk drives previously, as, for example, with a model CP-5500 Chinook Series 5.25-inch Disk Drive manufactured by Connor Peripherals, Inc. of San Jose, Calif. However, the required spacing for the two independent rotary actuators, of conventional design, in such a module necessitates smaller diameter disks for a given module size than would be required for the same size module having only a single rotary actuator. The storage capacity of the device is thus correspondingly reduced. As pointed out previously, with the apparatus of the present invention, two pairs of rotary actuators may be accommodated within a standard packaging size, or form factor, without reducing the size of the disks therein and thereby retaining the full storage capacity of the module. That is to say, four independent actuator arm assemblies may be accommodated with an actuator arm assembly 14a or 14b being located wholly within each quadrant of the module, such quadrants being defined by a pair of planes bisecting the sides of the base 20.

A further embodiment of the invention is shown in FIG. 5 of the drawings. In the hard disk module 10A therein shown, a pair of actuator assemblies 14c, 14d are shown positioned at diametrically opposed corners of the module with actuator assembly 14c being provided to communicate with the upper surfaces of the disks 12 in a disk stack and with actuator assembly 14d being provided to communicate with the lower disk surfaces of the disks in the disk stack. It will be obvious that a second pair of actuator assemblies 14c, 14d could be provided at the remaining pair of diametrically opposed corners of the module, if so desired, in order to increase the data handling capabilities of the module. The actuator assemblies 14c and 14d are similar in all respects to the previously described actuator assemblies 14a and 14b except that each of the actuator arms 15a (only the top pair of arms being shown in the plan view of FIG. 5) is bifurcated so as to support a pair of spaced magnetic transducer heads 16. The heads 16 of each actuator arm are aligned in a plane parallel to the planes of the disks and are generally offset equiangularly about the longitudinal axis of the actuator arm. As can be seen, the angular positioning of each actuator arm and the symmetrical positioning of the heads about the axis of the actuator arm will allow both heads to track over a single continuous path P between the outer track T1 and the inner track T2. It will thus be appreciated that each actuator assembly 14c, 14d will be required to rotate only one-half the angular distance required by the previously described assemblies 14a, 14b in order to cover the same radial distance on a given disk from outer track T1 to inner track T2 with one head covering one-half the path radially inward from T1 while the other head is covering the other half of path P radially outward from inner track T2. It is important that each track segment covered by the heads on a given actuator arm be of equal length and curvature across the data tracks. With such an arrangement, data access time can obviously be reduced since maximum rotational movement of the actuator arms is reduced by one-half.

Although the best modes contemplated for carrying out the present invention have been herein shown and described, it will be apparent that modification and variation may be made without departing from what is regarded to be the subject matter of the invention.

What is claimed is:

1. Magnetic disk storage apparatus comprising a stack of closely spaced magnetic disks each having opposed flat faces for carrying magnetically encoded data, means for rotating said disks, a first set of actuator arms each having a fixed end and a distal end, each of said arms being pivotably mounted at its fixed end for joint pivotal movement about a first actuator pivot axis extending adjacent to said stack of disks and parallel to the axis of rotation of the disks so that the arms extend within the stack between the spaced disks, a second set of actuator arms each having a fixed end and a distal end, each of said arms of the second set being pivotably mounted at its fixed end for joint pivotal movement independent of said first set of actuator arms about a second actuator pivot axis extending adjacent to said stack of disks and parallel to the axis of rotation of the disks so that the arms extend within the stack between the spaced disks, said second actuator pivot axis being separate and spaced from said first actuator pivot axis, a magnetic transducer head carried by each of said arms of both said first and second sets at its distal end for recording magnetically encoded data on or reading magnetically encoded data from one of the faces of one of the disks with each face of each disk having one head in read/write communication therewith, at least one of said actuator arms of each set having a drive arm rigidly attached thereto at the fixed end thereof and with the longitudinal axis of the drive arm extending away from the actuator arm along a line at an angle about the associated actuator pivot axis with the longitudinal axis of the actuator arm, and means carried by the distal end of each of said drive arms for providing pivotal movement thereto, said angle between the longitudinal axis of each drive arm and the longitudinal axis of the actuator arm from which it projects being less than 90 degrees so that the drive arm and actuator arm are generally arranged at acute angles with a plane that passes through said actuator pivot axis tangentially to the edges of said disks, said drive arms extending in opposed directions outwardly of said stack of disks so that said first set of actuator arms records on or reads from disk faces at one circumferential location on the disks and the second set of actuator arms records on or reads from disk faces at a second circumferential location on the disks angularly spaced from the first circumferential location about the axis of rotation of the disk stack.

2. Magnetic disk storage apparatus according to claim 1 wherein said first and second sets of actuator arms are arranged adjacent to each other so that they move over disk surfaces within 180 degrees of revolution of the disk stack.

3. Magnetic disk storage apparatus according to claim 2 wherein the actuator pivot axis of the first set of actuator arms and the actuator pivot axis of the second set of actuator arms are parallel and closely spaced from each other.

4. Magnetic disk storage apparatus according to claim 2 including third and fourth sets of actuator arms similar to said first and second sets of actuator arms but positioned adjacent the disk stack 180 degrees apart about the circumference of the stack from the position of the first and second sets of actuator arms.

5. Magnetic disk storage apparatus according to claim 1 wherein the heads of one set of actuator arms are arranged to record on or read from the top surfaces of the disks in the disk stack and the heads of the other set of actuator arms are arranged to record on or read from the bottom surfaces of the disks in the disk stack.

6. Magnetic disk storage apparatus according to claim 5 wherein the plane of the pair of actuator arms which extend between any pair of adjacent disks passes through both arms so as to minimize the required spacing between the disks in the disk stack.

7. Magnetic disk storage apparatus according to claim 1 wherein said means for providing pivotal movement to the drive arms comprises a pair of coils, a pair of spaced magnet pairs with each magnet pair being positioned about one of said coils, means for mounting one of said coil or magnet pair upon the distal end of each of the drive arms, and means for providing current to said coils to cause said drive arms to move said magnetic heads radially across the data carrying surfaces of the disks.

8. Magnetic disk storage apparatus according to claim 1 wherein the actuator pivot axis of the first set of actuator arms and the actuator pivot axis of the second set of actuator arms are parallel and are located in positions adjacent the stack 180 degrees apart about the circumference of the disk stack.

9. Magnetic disk storage apparatus according to claim 1 wherein each actuator arm carries a pair of magnetic transducer heads spaced radially with respect to the disks so that one of the heads will track over a radially outer arcuate path across its associated disk face while the other of the heads tracks over a contiguous radially inner path across said disk face.

10. A magnetic disk storage apparatus according to claim 1 wherein the line of applied force of each of the drive arm movement providing means passes through the center of percussion of the associated actuator arms.

11. In a magnetic disk storage apparatus including a stack of hard disks in superimposed spaced relationship each having read/write surfaces on both sides thereof and arranged for joint rotation about a central axis, an actuator arm assembly comprising a first set of actuator arms each mounted at one end thereof for joint pivotal movement about a first actuator pivot axis extending adjacent to said stack of disks and parallel to the axis of rotation of the disks so that the arms extend within the stack between the spaced disks, a second set of actuator arms each mounted at one end thereof for joint pivotal movement about a second actuator pivot axis extending adjacent to said stack of disks and parallel to the axis of rotation of the disks so that the arms extend within the stack between the spaced disks, said second actuator pivot axis being separate and spaced from said first actuator pivot axis, each of said arms of the first and second sets having a distal end spaced from said mounted end, a magnetic transducer head carried by the distal end of each actuator arm for recording magnetically encoded data on or reading magnetically encoded data from one of the faces of one of the disks, at least one of said actuator arms of each set having a drive arm rigidly attached thereto at the mounted end thereof and with the longitudinal axis of the drive arm extending away from the actuator arm along a line to a distal end thereof, said drive arm extending at an angle about said actuator pivot axis with the longitudinal axis of said one actuator arm, means carried by the distal end of each of said drive arms for providing pivotal movement thereto, said angle between the longitudinal axis of each drive arm and the longitudinal axis of the actuator arm from which it projects being less than 90 degrees so that the drive arm and actuator arm are generally arranged at acute angles with a plane that passes through said actuator pivot axis tangentially to the edges of said disks, said drive arms extending in opposed directions so that said first set of actuator arms records on or reads from disk faces at one circumferential location within the disk stack and the second set of actuator arms records on or reads from disk faces at a second circumferential location within the disk stack angularly spaced from the first location about the axis of the disk stack.

12. In a magnetic disk storage apparatus according to claim 11 wherein the actuator pivot axis of the first set of actuator arms and the actuator pivot axis of the second set of actuator arms are parallel and closely spaced from each other.

13. In a magnetic disk storage apparatus according to claim 11 wherein said means for providing pivotal movement to the drive arms comprises a pair of coils, a pair of spaced magnet pairs with each magnet pair being positioned about one of said coils, means for mounting one of said coil or magnet pair upon the distal end of each of the drive arms, and means for providing current to said coils to cause said drive arms to move said magnetic heads radially across the data carrying surfaces of the disks.

14. A magnetic disk storage module comprising a generally rectangularly shaped base member for mounting the operative components of the module and for filling a predetermined hard disk drive space in a computer or the like, said base member having four equal quadrants as defined by planes bisecting the sides of the base, a stack of closely spaced magnetic disks mounted centrally of said base member, each of said disks having opposed flat faces for carrying magnetically encoded data, means for jointly rotating said disks, four actuator arm assemblies with one of such assemblies being located wholly within each of the quadrants of said base member directly adjacent to said stack of disks, each of said actuator arm assemblies comprising a set of actuator arms, each being mounted at one end thereof for joint pivotal movement about an actuator pivot axis extending parallel to the axis of rotation of the disks, each of said arms extending adjacent to a disk face and carrying a magnetic transducer head at its distal end spaced from the pivotably mounted end for recording data on or reading data from one of the faces of one of the disks, and means for separately providing independent joint pivotal movement to each of said actuator arm assemblies.

15. A magnetic disk storage module according to claim 14 wherein said means for providing movement includes a drive arm fixed to the actuator arms at the mounted ends thereof and extending outwardly therefrom and wherein said movement providing means includes a motor operatively connected to each of said drive arms.

16. A magnetic disk storage module according to claim 15 wherein the line of applied force of each motor passes through the center of percussion of the associated actuator arms.

17. A magnetic disk storage module according to claim 15 wherein the longitudinal axis of each of said drive arms forms an acute angle of less than 90 degrees with the longitudinal axes of the associated actuator arms.

18. A magnetic disk storage module according to claim 17 wherein the actuator arm assemblies are arranged in pairs at opposite ends of the module with the drive arms of each pair of actuator arm assemblies extending outwardly of the module in generally opposed directions.

19. A magnetic disk storage module comprising a generally rectangularly shaped base member for mounting the operative components of the module and for filling a predetermined hard disk drive space in a computer or the like, a stack of closely spaced magnetic disks mounted on said base member, each of said disks having opposed flat faces for carrying magnetically encoded data, means for jointly rotating said disks, a first set of actuator arms each having a fixed end and a distal end, each of said arms being pivotally mounted at its fixed end upon said base member for joint pivotal movement about an actuator pivot axis extending adjacent to said stack of disks and parallel to the axis of rotation of the disks so that the arms extend within the stack between the spaced disks, a second set of actuator arms each having a fixed end and a distal end, each of said arms of the second set being pivotally mounted at its fixed end upon said base member independently of said first set of actuator arms about an actuator pivot axis extending adjacent to said stack of disks and parallel to the axis of rotation of the disks so that the arms extend within the stack between the spaced disks, each of the arms of both said first and second sets carrying a magnetic transducer head at its distal end for recording data on or reading data from one of the faces of one of the disks, the actuator pivot axes of the first and second sets of actuator arms being separate and spaced from each other, said first and second sets of actuator arms being arranged closely adjacent to each other and adjacent to the disk stack but with the magnetic heads carried by the arms of the first set being positioned for reading/writing communication with a first circumferential location within the disk stack and with the magnetic heads carried by the arms of the second set being positioned for reading/writing communication with a second circumferential location within the disk stack angularly spaced from the first circumferential location about the axes of rotation of the disk stack, and means for independently pivoting each of said first and second sets of actuator arms about the respective pivot axis to move the associated magnetic heads across the disk faces said means for pivoting comprising a pair of drive arms with one drive arm being connected to each set of actuator arms at the fixed ends thereof and extending along an axis at an angle about the associated actuator pivot axis with the longitudinal axes of the associated actuator arms, and a motor for rotating each drive arm about the associated pivot axis, each drive arm being positioned at an angle about the associtated actuator pivot axis from the longitudinal axes of the associated actuator arms with such angle being less than 90 degrees so that the drive arms of the first and second sets of actuator arms extend in generally opposed directions outwardly of said module.

20. A magnetic disk storage module according to claim 19 wherein the line of applied force of each motor passes through the centers of percussion of the associated actuator arms.

21. A magnetic disk storage module according to claim 19 wherein the magnetic heads of one set of actuator arms are arranged to record on or read from the top surfaces of the disks in the disk stack and the magnetic heads of the other set of actuator arms are arranged to record on or read from the bottom surfaces of the disks in the disk stack.

* * * * *